(12) United States Patent
Spatafora et al.

(10) Patent No.: US 6,484,867 B2
(45) Date of Patent: Nov. 26, 2002

(54) DEVICE FOR FORMING GROUPS OF CIGARETTES

(75) Inventors: Mario Spatafora, Bologna (IT); Loris Grepioni, Castel Maggiore (IT)

(73) Assignee: G. D S.p.A., Bologna (IT)

( * ) Notice: Subject to any disclaimer, the term of this patent is extended or adjusted under 35 U.S.C. 154(b) by 0 days.

(21) Appl. No.: 09/865,620

(22) Filed: May 29, 2001

(65) Prior Publication Data

US 2001/0047806 A1 Dec. 6, 2001

(30) Foreign Application Priority Data

May 30, 2000 (IT) ........................................ BO200A324

(51) Int. Cl.⁷ ............................................. B65G 47/30
(52) U.S. Cl. ................................ 198/418.1; 198/418.4; 131/282; 53/444; 53/149
(58) Field of Search ........................... 198/418.1, 418.4; 131/282, 283; 53/444, 149, 151; 414/795.9, 796.1, 797.9

(56) References Cited

U.S. PATENT DOCUMENTS

| | | | | |
|---|---|---|---|---|
| 4,507,903 A | * | 4/1985 | Focke et al. ................ | 531/151 |
| 4,571,917 A | * | 2/1986 | Wheless et al. .............. | 53/151 |
| 4,962,772 A | | 10/1990 | Manservigi | |
| 5,375,392 A | * | 12/1994 | Oberdorf ..................... | 53/149 |
| 5,617,943 A | * | 4/1997 | Belvederi et al. ........ | 198/418.1 |
| 6,298,976 B1 | * | 10/2001 | David ..................... | 198/418.3 |

FOREIGN PATENT DOCUMENTS

FR           2327923           5/1977

* cited by examiner

Primary Examiner—Joseph E. Valenza
(74) Attorney, Agent, or Firm—The Law Offices of Timothy J. Klima

(57) ABSTRACT

Cigarettes are formed into groups by a device comprising a hopper through which to direct a flow of cigarettes, a conveyor with pockets moving intermittently past a discharge outlet of the hopper, and a reciprocating pusher located on the side of the hopper opposite from the conveyor by which a portion of the flow corresponding to one group is directed with each forward stroke into a respective pocket. To avoid damage of the kind often associated with sliding contact and axial compression, the cigarettes adjacent to those ejected by the pusher are restrained when their cylindrical surfaces are attracted by suction generated through ports located inside the hopper.

15 Claims, 8 Drawing Sheets

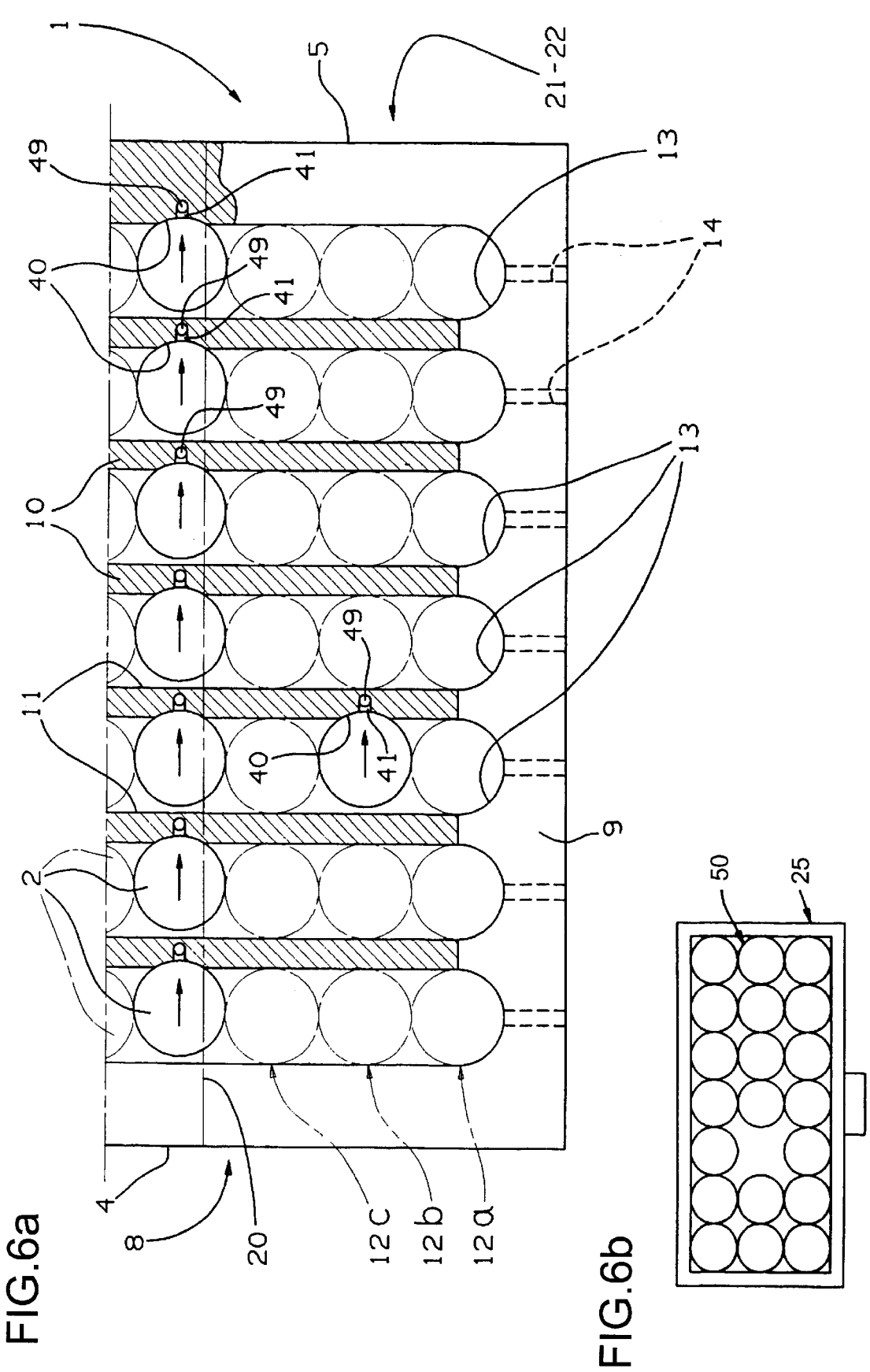

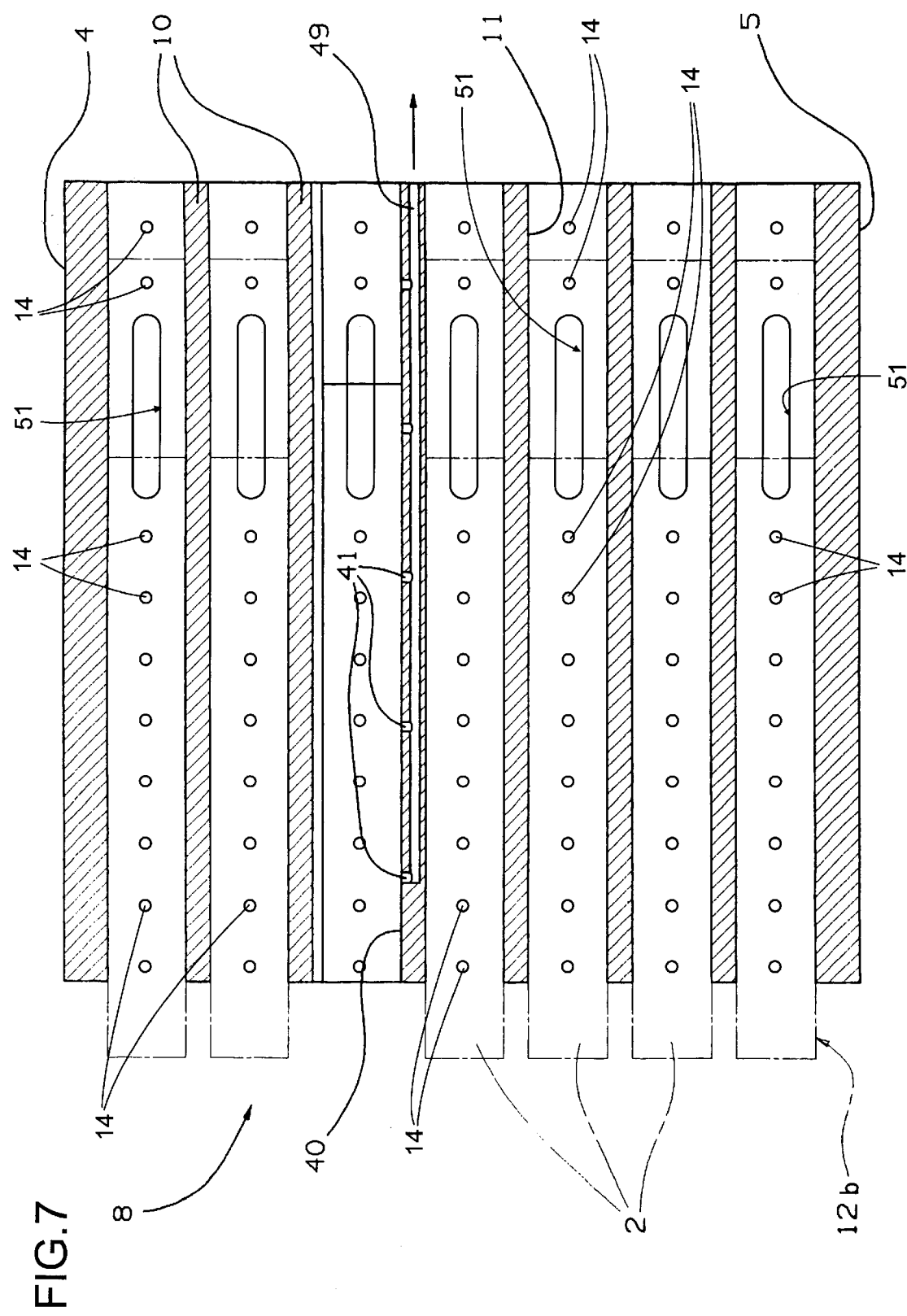

DEVICE FOR FORMING GROUPS OF CIGARETTES

BACKGROUND OF THE INVENTION

The present invention relates to a device for forming groups of cigarettes.

In particular, the present invention relates to a device for the formation of cigarettes into groups, each constituting the contents of one packet. Conventionally, the basic element in a system for feeding cigarettes to a packer consists in a hopper affording a top inlet into which the cigarettes are directed en masse, horizontally and side by side, and a discharge outlet from which the cigarettes are removed in groups made up of a predetermined number.

The groups of cigarettes, appearing as a single layer or a plurality of layers positioned one on top of another, are supplied to a wrapping line by means of an intermittently driven conveyor device furnished with a plurality of uniformly distributed pockets each designed to contain a relative group. The hopper in question comprises two side walls extending parallel to the axes of the cigarettes, interconnected by two transverse walls disposed mutually parallel and separated one from the other by a distance marginally greater than the length of one cigarette. The bottom of the hopper presents at least one outlet enclosed by a horizontal plate and partitioned by substantially vertical and mutually parallel walls into a plurality of channels inside of which the massed contents of the hopper separate and form substantially vertical stacks of single cigarettes.

Considered in relation to the plate, therefore, the cigarettes appear ordered in horizontal layers each consisting in a number of cigarettes equal to the number of channels and disposed at increasing heights departing from the bottom layer, which lies in contact with the plate.

During each pause of the intermittently driven conveyor a horizontal reciprocating pusher, located on the side of the hopper remote from the conveyor, advances axially through an inlet opening afforded by one of the aforementioned transverse walls and enters into contact with one or more layers of the cigarettes, pushing them through an outlet opening afforded by the remaining transverse wall and into a pocket of the conveyor.

In this way, a group of cigarettes is formed in the pocket, consisting in a single layer or in two or more layers disposed one on top of another.

Groups consisting in a plurality of layers can also be formed by directing layers into a pocket singly and in succession, one on top of another, from a hopper with discrete discharge outlets corresponding in number to the number of layers.

In both of the cases mentioned, the cigarettes ejected from the hopper by the reciprocating pusher are caused to slide in contact with the cigarettes inside the hopper positioned immediately above the outlet, which in their turn combine to form another layer.

As a consequence of the friction generated by the sliding contact between the ejected cigarettes, which are displaced at a relatively high velocity, and the stationary cigarettes lying adjacent to them, the stationary cigarettes are urged axially against a restraint afforded by the inside face of the front transverse wall with the result that the ends can be crushed and shreds of tobacco filler lost.

Once the pusher has regained its former position, the cigarettes subjected to this damaging axial compression are free to drop into the outlet of the hopper and their inclusion in the layers displaced during the next cycle of the pusher can result in the formation of a defective group, which will be eliminated during subsequent steps of the process.

Reference has been made thus far to the case of groups consisting in a single layer and of groups consisting in a plurality of layers all comprising an identical number of cigarettes, whereas in the majority of cases the contents of a packet of cigarettes will consist in a plurality of layers comprising dissimilar numbers of cigarettes.

For instance, the contents of a soft packet of twenty cigarettes will consist generally in a group comprising two outer layers of seven cigarettes each and an intermediate layer of six cigarettes. Groups made up in this way present a particularly stable structure since the cigarettes are arranged quincuncially.

Very commonplace likewise are groups of twenty cigarettes including two contiguous layers of seven cigarettes and one outer layer of six cigarettes. Such a group will constitute the typical contents of a rigid packet with a hinged lid, given that the particular geometry enables a faultless closure of this style of packet.

Another reason for using groups formed of layers comprising different numbers of cigarettes is that in the event of an increase in production costs or of taxes, especially in countries where cigarette vending machines are in widespread use, the retail price can be maintained and the adjustment made by changing the contents of the packet, reducing the number of cigarettes in at least one layer of the group as appropriate. This naturally obviates the need to make alterations to the vending machine.

The prior art method of forming irregular groups, that is to say groups made up of layers containing different numbers of cigarettes, involves the use of pushers shaped in such a way that when entering the discharge outlet of the hopper they will engage only the cigarettes destined to make up the group.

Since however this expedient does not preclude the possibility that one or more cigarettes, albeit isolated from the action of the pusher, might be drawn forward by the adjacent cigarettes through friction and find their way into the pocket on the conveyor, the outlet of the hopper is equipped with restraints in the form of projecting fins disposed in alignment with the positions occupied by the excluded cigarettes.

Such a solution thus involves axial compression and the risk of damage to the restrained cigarettes in the same way as described previously.

It will be clear from the foregoing that the drawback described with reference to the formation of a group, whether a single layer or a plurality of layers arranged one on top of the other, all of which comprising an identical number of cigarettes, can become especially serious in the case of groups composed of layers comprising dissimilar numbers of single cigarettes, given the increased number of cigarettes that are subject to the damaging axial compression induced by the restraints.

The object of the present invention is to provide a device for forming groups of cigarettes such as will be free of the aforementioned drawbacks.

SUMMARY OF THE INVENTION

The stated object is realized according to the present invention in a device for forming groups of cigarettes, comprising a hopper through which to direct a flow of cigarettes disposed horizontally side by side and advancing each in a direction transverse to its longitudinal axis toward at least one discharge outlet of the hopper enclosed at the bottom by a substantially horizontal plate and laterally by two side walls disposed parallel to the longitudinal axis, fitted internally with a plurality of partition walls disposed substantially parallel to the side walls and defining a plurality of channels between the side walls of width equal substantially to the diameter of one cigarette, also a pocket conveyor moving transversely to the direction of the flow, and a reciprocating transfer device capable of movement in a direction parallel to the longitudinal axis through a transfer station coinciding with the outlet, by which a portion of the flow is engaged during each forward stroke and transferred from the hopper to a respective pocket to form a group.

To advantage, the device comprises restraining means designed to prevent a relative axial sliding movement of the cigarettes, acting transversely to the axis and activated during each forward stroke of the transfer device at a location coinciding with at least one of the predetermined positions occupied internally of the hopper by the cigarettes in contact with the portion of the flow engaged by the transfer device.

Another drawback that can be encountered with hoppers of the type in question is that particles of tobacco filler collect on the bottom plate and lodge between the plate and the cigarettes; this occasions incorrect positioning of the cigarettes and thus disallows the correct formation of the group of cigarettes.

A further object of the present invention is to overcome this drawback.

BRIEF DESCRIPTION OF THE DRAWINGS

The invention will now be described in detail, by way of example, with the aid of the accompanying drawings, in which:

FIGS. 6 and 7 are sectional views, in elevation and in plan respectively, of a further embodiment of the device shown in FIGS. 1 to 5;

DESCRIPTION OF THE PREFERRED EMBODIMENTS

Figure 1:
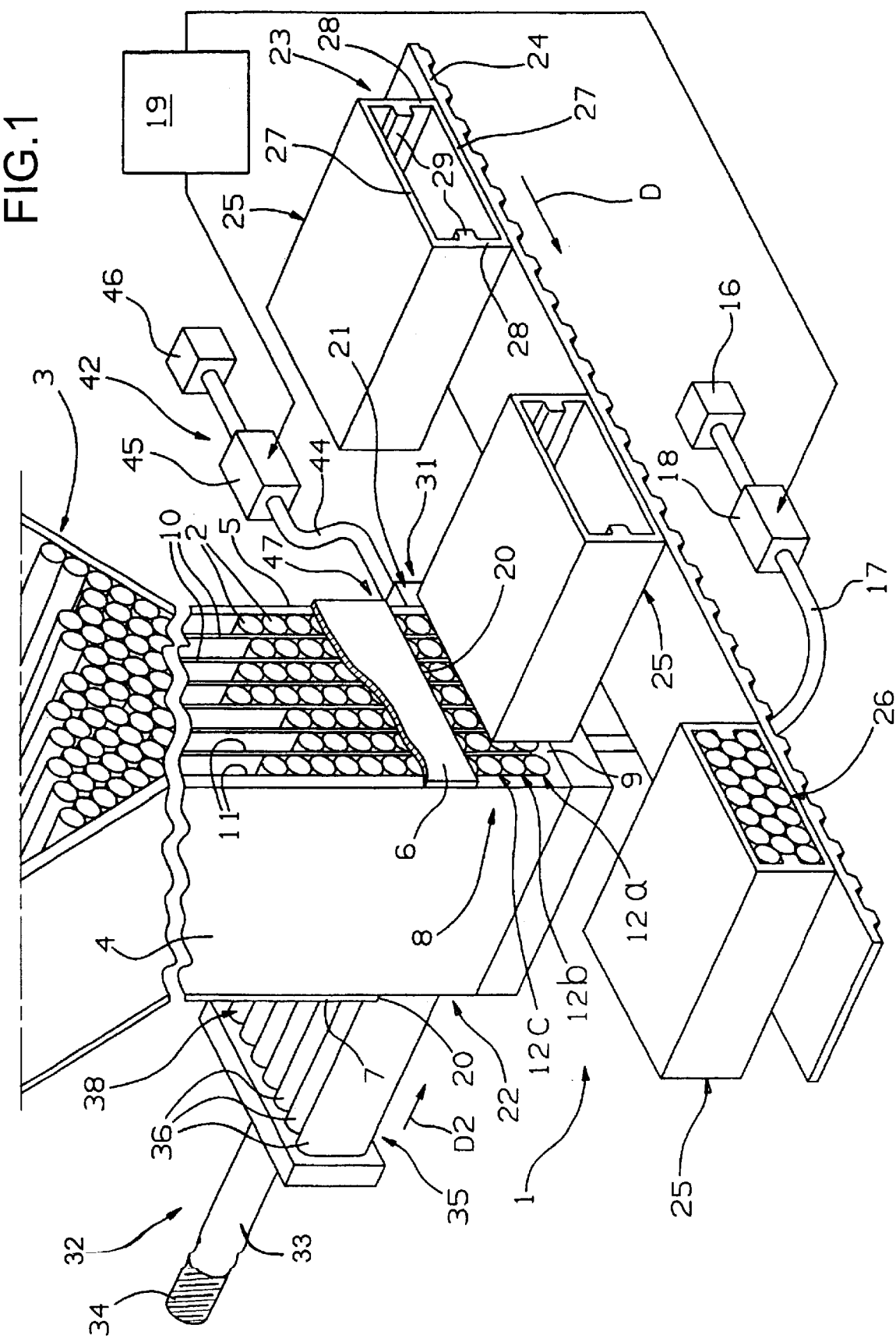
FIG. 1 illustrates a device embodied according to the present invention, viewed in perspective.
Figure 2:
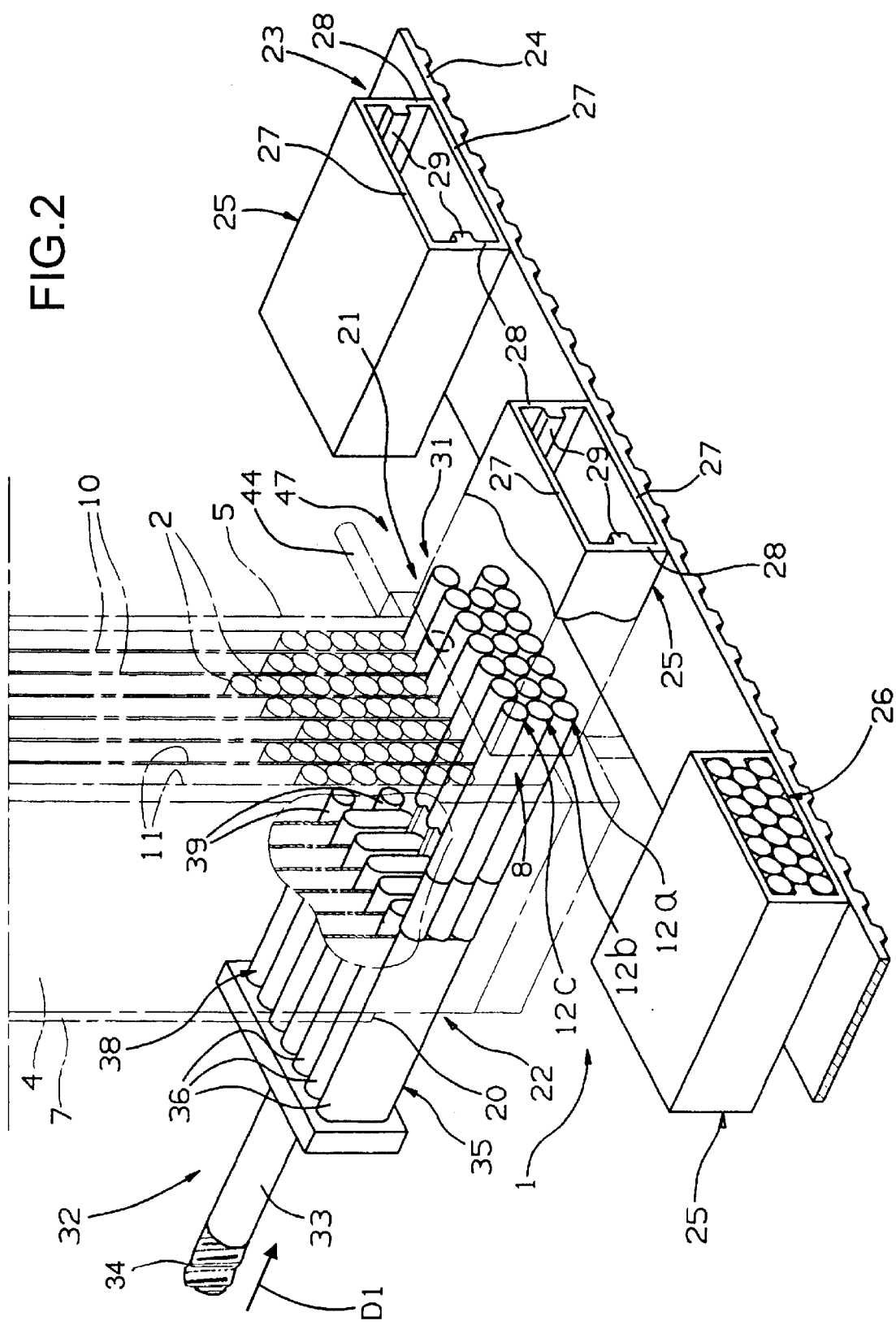
FIG. 2 illustrates the device of FIG. 1, in perspective, viewed with certain parts omitted for clarity and during a different step of operation.
Figure 3:
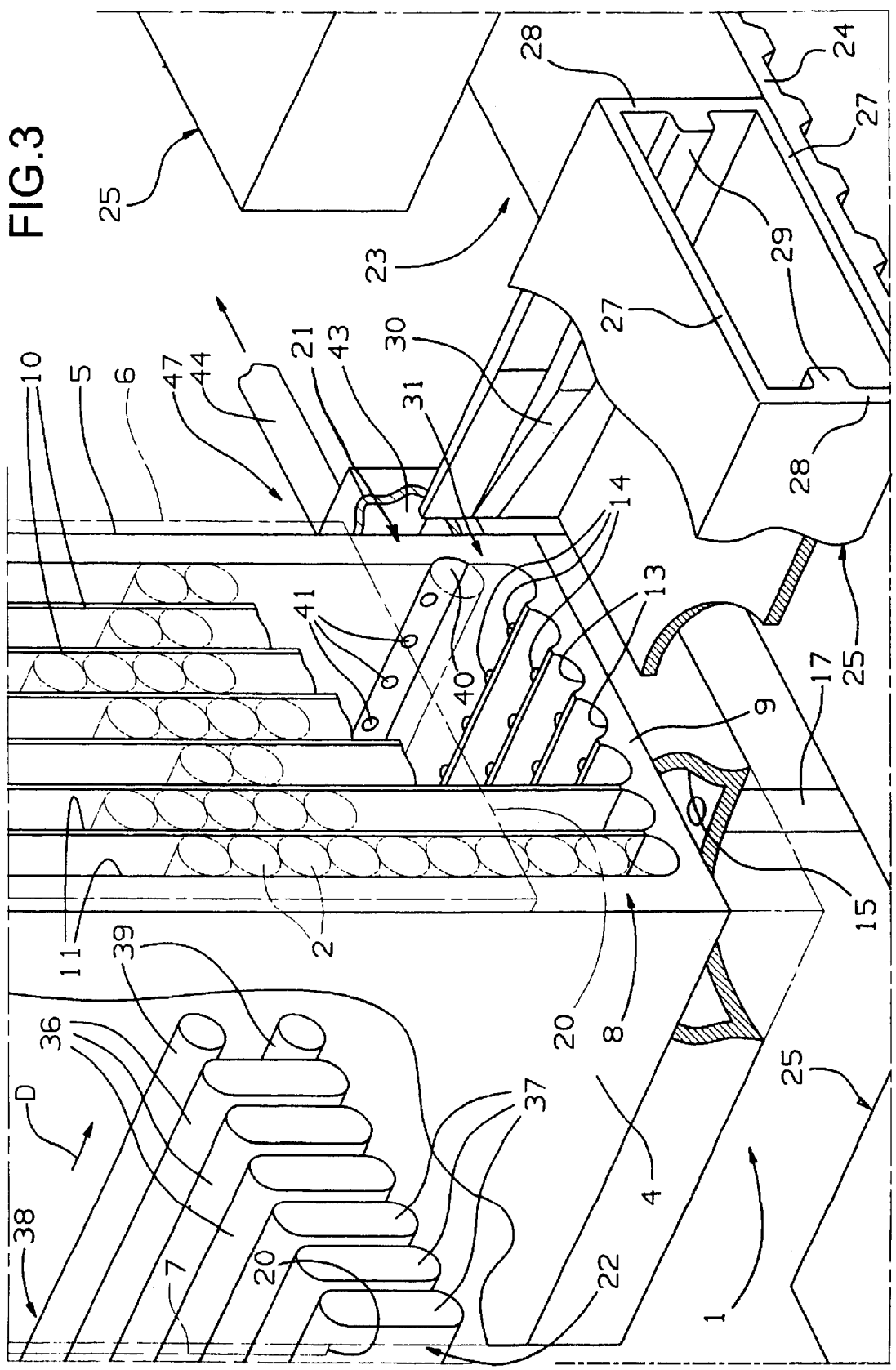
FIG. 3 is an enlarged detail of FIGS. 1 and 2.

Referring to FIGS. 1, 2 and 3 of the drawings, 1 denotes a device, in its entirety, for forming groups of cigarettes 2 each making up the contents of one packet.

The device 1 comprises a hopper 3 (a bottom end portion only is indicated in the drawings) through which to direct a continuous flow of cigarettes disposed horizontally and side by side.

The hopper 3 is compassed by two side walls 4 and extending parallel to the axes of the cigarettes, interconnected by a front wall 6 and a rear wall 7 disposed transversely to the side walls 4 and 5 and separated one from another by a distance marginally greater than the length of one cigarette.

The lower extremity of the hopper 3, referred to as a discharge outlet and denoted 8, is enclosed horizontally by a bottom plate 9 and partitioned internally by a plurality of substantially vertical walls 10 separated one from the next by a distance nominally equal to the diameter of one cigarette. Thus, the bottom end of the hopper 3 is divided up between the two side walls 4 and 5 into a plurality of channels 11 inside of which the cigarettes 2 are disposed in substantially vertical columns.

Figure 4:
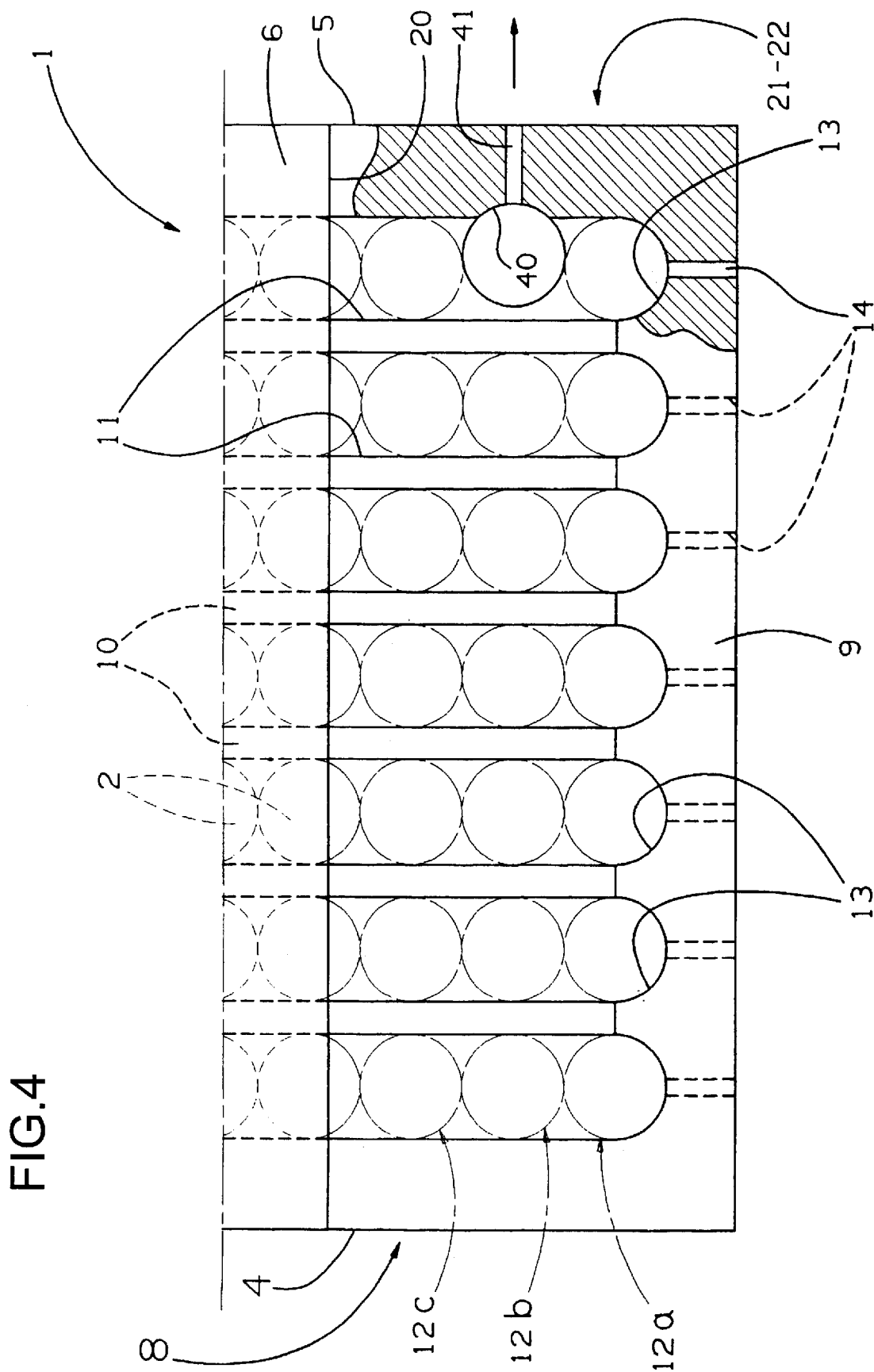
FIG. 4 is the section on a detail of FIGS. 1, 2 and 3.

Considered in relation to the bottom plate 9, accordingly, the cigarettes 2 appear ordered in horizontal layers 12 as illustrated to advantage in FIG. 4, consisting in a number of cigarettes 2 equal to the number of channels 11 and disposed at increasing heights departing from a first or bottom layer 12a resting directly on the plate 9, with a second layer 12b resting on the first layer 12a and a third layer 12c resting on the second layer 12b.

The plate 9 presents a plurality of flutes 13 aligned with the outlets of the channels 11, each appearing semicircular in section and of diameter substantially identical to the diameter of a single cigarette 2; each flute 13 in turn is furnished with a plurality of through holes 14 emerging into a chamber 15 beneath and connected to a source 16 of negative pressure by way of a pipeline 17 fitted with valve means 18 interlocked to a master control unit 19 (FIGS. 1 and 3).

The front and rear walls 6 and 7 present relative bottom horizontal edges 20 positioned substantially on a level with the layer of cigarettes fourth from bottom, in such a way as to create two respective openings 21 and 22 between the selfsame edges and the bottom plate 9, axially aligned one with the other and affording access to the inside of the hopper 3.

Also indicated is a conveyor 23 aligned with the bottom of the discharge outlet 8 on the side of the front wall 6 and consisting in a belt loop. More exactly, the drawings illustrate the top horizontal branch 24 of the belt which extends transversely to the axes of the cigarettes 2, occupying the same plane as the plate 9, and is driven intermittently in a direction denoted D by means not illustrated in the drawings.

The conveyor 23 carries a number of substantially parallelepiped pockets 25 spaced along its length at a predetermined pitch and serving to accommodate respective groups 26 of cigarettes, as will be made clear in due course.

The pockets 25 present four walls arranged in two parallel pairs extending transversely to the top branch 24, or more exactly two larger horizontal walls 27 and two smaller vertical walls 28, and are open at two opposite ends of which one faces the hopper 3.

Internally of the single pocket 25, each of the two smaller walls 28 presents a horizontal rib 29 positioned intermediately in relation to the two larger walls and exhibiting a splay 30 at the end directed toward the hopper 3.

The pitch of the conveyor 23 is selected in such a way that with each step indexed, a pocket 25 will move into a transfer position 31 aligned axially with the openings 21 and 22 of the hopper discharge outlet 8.

Also forming part of the device 1 disclosed is a reciprocating transfer device 32 stationed on the side of the hopper 3 remote from the conveyor 23, comprising a horizontal shaft 33 capable of axial movement brought about by reciprocating actuator means 34 in a direction D1 normal to the conveying direction D, and a pusher 35 mounted to the free end of the shaft 33.

The pusher 35 presents a plurality of fingers 36 equal in number to the number of the channels 11, being seven in the example illustrated, disposed horizontally one alongside the next and extending along the aforementioned direction D1 of movement toward respective channels 11 of the outlet 8, of which the forwardmost ends present flat faces 37 lying in a common vertical plane parallel to the rear wall 7 of the hopper.

Each of the first six fingers 36, viewing left to right in FIGS. 1 and 3, presents a substantially rectangular section with rounded ends of which the horizontal dimension is marginally less than the width of the single channel 11, and the vertical dimension equal to three times the diameter of one cigarette.

The seventh finger 36 is embodied as a fork 38 comprising two prongs 39 of circular cross section aligned vertically one with another and of diameter substantially equal to the diameter of a single cigarette 2, which are separated one from the other by a distance equal likewise to the diameter of one cigarette 2.

The pusher 32 is reciprocated by the actuator means 34 between a retracted position lying outside the dimensional compass of the hopper 3, and an operating position in which the free ends of the fingers 36, passing through the openings 22 and 21 and along the channels 11, reach the open end of a pocket 25 occupying the transfer position 31.

One side wall 5 of the hopper 3 is furnished with a groove 40 on the inside, which presents a concave face offered to the relative channel 11 and extends parallel to the transfer direction D1 at a height coinciding with the level of the position occupied by a cigarette belonging to the second layer 12b, that is to say separated from the surface of the plate 9 by a distance substantially equal to the diameter of one cigarette 2 (see also FIG. 4). The same side wall 5 is also furnished with a plurality of through holes 41 arranged along the groove 40 and forming part of a pneumatic circuit denoted 42 in its entirety.

Also forming part of the pneumatic circuit 42 is a chamber 43 located externally of and adjacent to the side wall 5, connected to the channel 11 by way of the holes 41, and a pipeline 44 equipped with valve means 45 by way of which the chamber 43 can be connected to a source 46 of negative pressure.

These valve means 45 also are interlocked to the master control unit 19.

The pneumatic circuit 42 constitutes a part of restraining means 47 intended to disallow the axial sliding motion of certain cigarettes 2 during the formation of the group 26.

In operation of the device thus described, the cycle resulting in the formation of a group 26 of cigarettes will depart from an initial situation in which the cigarettes are ordered in stacks inside the seven channels 11 of the hopper 3, a pocket 25 of the conveyor 23 is stationed in readiness at the transfer position 31, and the pusher 32 is in the retracted position outside the dimensional compass of the hopper 3.

As illustrated in FIG. 2, the actuator means 34 come into operation and the pusher 32 moves forward toward the hopper 3, passing through the opening 22 and into the channels 11.

The effect of the movement is to eject a portion of the flow of cigarettes 2 from the hopper 3. More exactly, six fingers 36 of the pusher 32 will each eject three stacked cigarettes whilst the seventh finger 36, the fork 38, engages and ejects only two cigarettes 2, one of which belonging to the bottom layer 12a in contact with the plate 9 and the other belonging to the third layer 12c, without touching the layer 12b in between.

At the same time, the control unit 19 pilots the valve means 45 to open and connect the groove 40 with the source 46 of negative pressure by way of the pipeline 44.

The cylindrical surface of the cigarette 2 lying adjacent to the groove now becomes subject to the force of suction generated through the holes 41, with the result that the cigarette is restrained internally of the hopper 3, notwithstanding the dragging action of the cigarette 2 above and the cigarette 2 beneath.

With the adoption of restraining means 47 acting transversely on the cylindrical surface of the cigarettes 2, it becomes possible to dispense with the need for axial stops of whatever description as employed conventionally, and thus avoid subjecting the cigarettes to damaging forces of compression.

A group of twenty cigarettes comprising two outer layers of seven cigarettes and one intermediate layer of six cigarettes is thus ejected from the hopper 3 and, as the pusher 32 reaches its travel limit, directed into the pocket 25 occupying the transfer position 31.

As the group is inserted into the pocket 25, the intermediate layer 12b is forced by the two ribs 29 with their splays 30 to shift sideways in relation to the adjacent top layer 12c and bottom layer 12a, causing the twenty ejected cigarettes 2 to assume a more stable composition overall.

A group of this type, appearing as a plurality of interlocking quincunxes and denoted 26, is shown in FIG. 1 occupying a pocket 25 located downstream of the transfer position 31.

Following the insertion of the group 26 into the pocket 25, the conveyor 23 indexes and brings an empty pocket 25 into the transfer position 31, the pusher 32 simultaneously vacating the hopper 3 and thus allowing the cigarettes above to drop down the channels 11 and fill the spaces occupied previously by the cigarettes 2 of the group just ejected. In particular, the cigarette 2 restrained hitherto in the groove 40 drops to the bottom of the outlet and into a position of contact with the plate 9.

As the cigarettes descend, the control unit 19 pilots the one set of valve means 45 to shut off the suction generated along the groove 40, and the other valve means 18 to connect the flutes 13 with the corresponding source of negative pressure 16 by way of the holes 14 and the relative circuit 17.

The suction generated along the flutes 13 serves to accelerate the descent of the cigarettes 2.

To this end, it is observably expedient that the source of negative pressure 16 should be connected at least to the ends of the flutes 13 nearer the pusher 32, and more precisely the ends nearer the opening 22 of the rear wall 7, in such a way that the cigarettes will be positioned correctly and immediately when the pusher is retracted. As the pusher returns to the retracted position, in fact, the forwardmost part of each cigarette in contact with the top of the pusher will be freed first, and the rearwardmost part of the cigarette thereafter. This means that as the forwardmost part of the cigarette can drop unhindered by gravity into the relative flute 13, the rearwardmost part remains elevated by the pusher 32 and it can happen that as the pusher 32 is fully retracted, at least one or more of the cigarettes in question will fall skew, causing a jam during the subsequent forward stroke of the pusher 32.

The suction generated along the flutes 13 serves also to remove any particles of tobacco filler that may collect in the selfsame flutes 13 during the descent of the cigarettes 2.

To this end, as discernible in FIG. 7, each flute 13 is furnished additionally with a slot 51 of elongated appearance extending parallel to the longitudinal axis of the cigarette 2.

In particular, each flute 13 can be embodied both with a plurality of holes 14 and with at least one slot 51 substantially aligned with the holes and occupying a position near to the opening 22 in the rear wall 7 of the discharge outlet 8. The slot 51 can be connected either to the aforementioned source 16 of negative pressure, by way of the relative pneumatic circuit 17, or to an independent vacuum circuit (not illustrated) with respective valve means (not illustrated) that will come into operation at predetermined intervals, or whenever needed, to connect the slot 51 to the corresponding source of negative pressure.

The description thus far relates to the formation of a seven-six-seven type group such as will be wrapped in a soft or crush style of packet.

In the case of a group of twenty cigarettes for a rigid packet, that is to say with two adjacent layers of seven cigarettes and one outer layer of six cigarettes, the device 1 as described above will be modified in such a way as to restrain the cigarette 2 positioned above and adjacent to the cigarette identified in the previous example, and thus reduce the number of cigarettes in the third layer 12c to six.

Figure 5A:
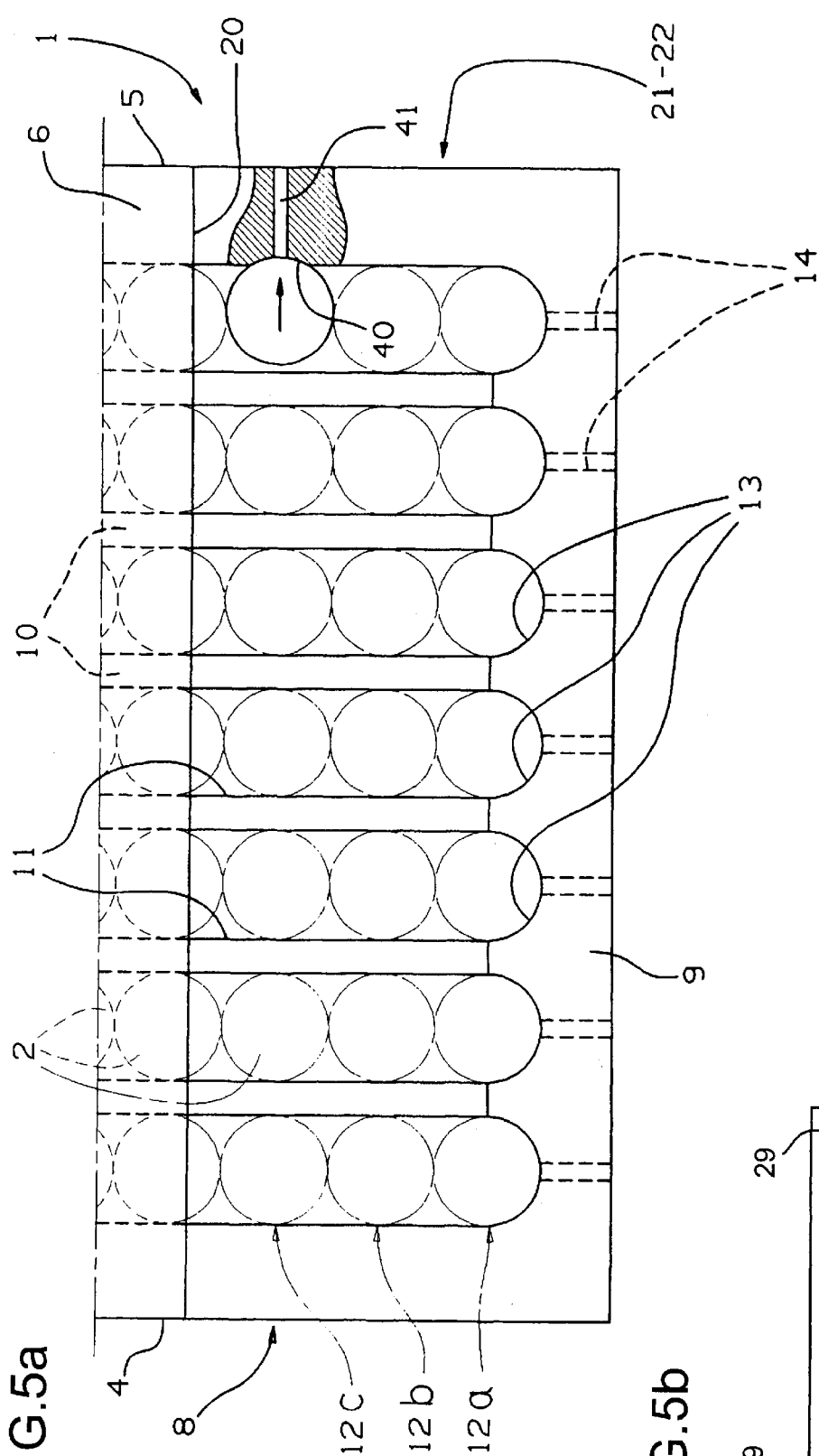
FIG. 5 illustrates an alternative embodiment of the device shown in FIGS. 1 to 4, viewed in section.
Figure 5B:
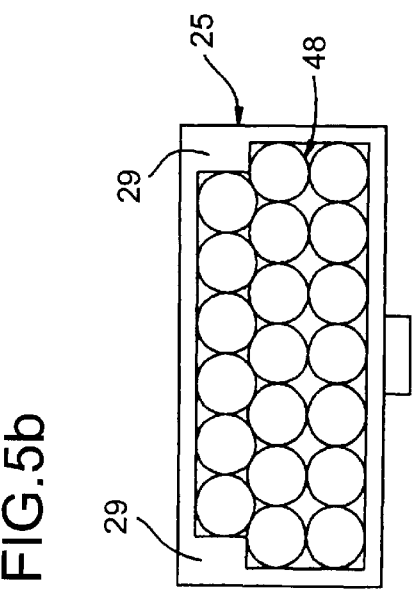

Accordingly, as illustrated in FIG. 5, the groove 40 furnished with the holes 41 connected to the source 46 of negative pressure will be located at a height coinciding with the third layer 12c of cigarettes, and the relative finger 36 (not shown) of the pusher 32 will no longer appear as a fork 38 but with a substantially rectangular section having rounded ends similar to that of the remaining six fingers 36, albeit exhibiting a shorter vertical dimension, i.e. equivalent to twice the diameter of a single cigarette, so that the one predetermined cigarette will be excluded from the pushing action Following their insertion into the pocket 25, in this instance furnished with two ribs 29 at a level corresponding to that of the third layer 12c, the twenty cigarettes will appear as in the example of FIG. 5b, where the group is denoted 48.

In the example of FIGS. 6 and 7, a cigarette is excluded not from an end channel 11 but from one of the intermediate channels, and in particular from the third channel 11, omitted in this instance from the second layer 12b.

One of the two partition walls 10 compassing the channel 11 in question is provided with a groove 40 positioned at a height corresponding to that of the excluded cigarette, running parallel to the pushing direction D1 and exhibiting holes 41 connected to a duct 49 located inside the wall 10 and thence to the relative pneumatic circuit 42. As the excluded cigarette 2 belongs to the intermediate layer 12b, the finger 36 destined to enter the corresponding channel 11 consists in a fork similar to the fork 38 described previously.

Following their insertion into the pocket 25, in this instance having no ribs, the twenty cigarettes will appear as in the example of FIG. 6b, where the group is denoted 50.

In the example of FIG. 6, transversely acting restraining means 47 according to the invention are located in alignment with the positions occupied by all the cigarettes making up the layer immediately above the third layer 12c.

This has the effect, whatever the type of group formed by the device 1, of ensuring the cigarettes making up the layer in question are not compressed axially against the inside face of the front wall 6 when the fingers 36 move forward, yet without the need to eliminate the wall 6.

Figure 8:
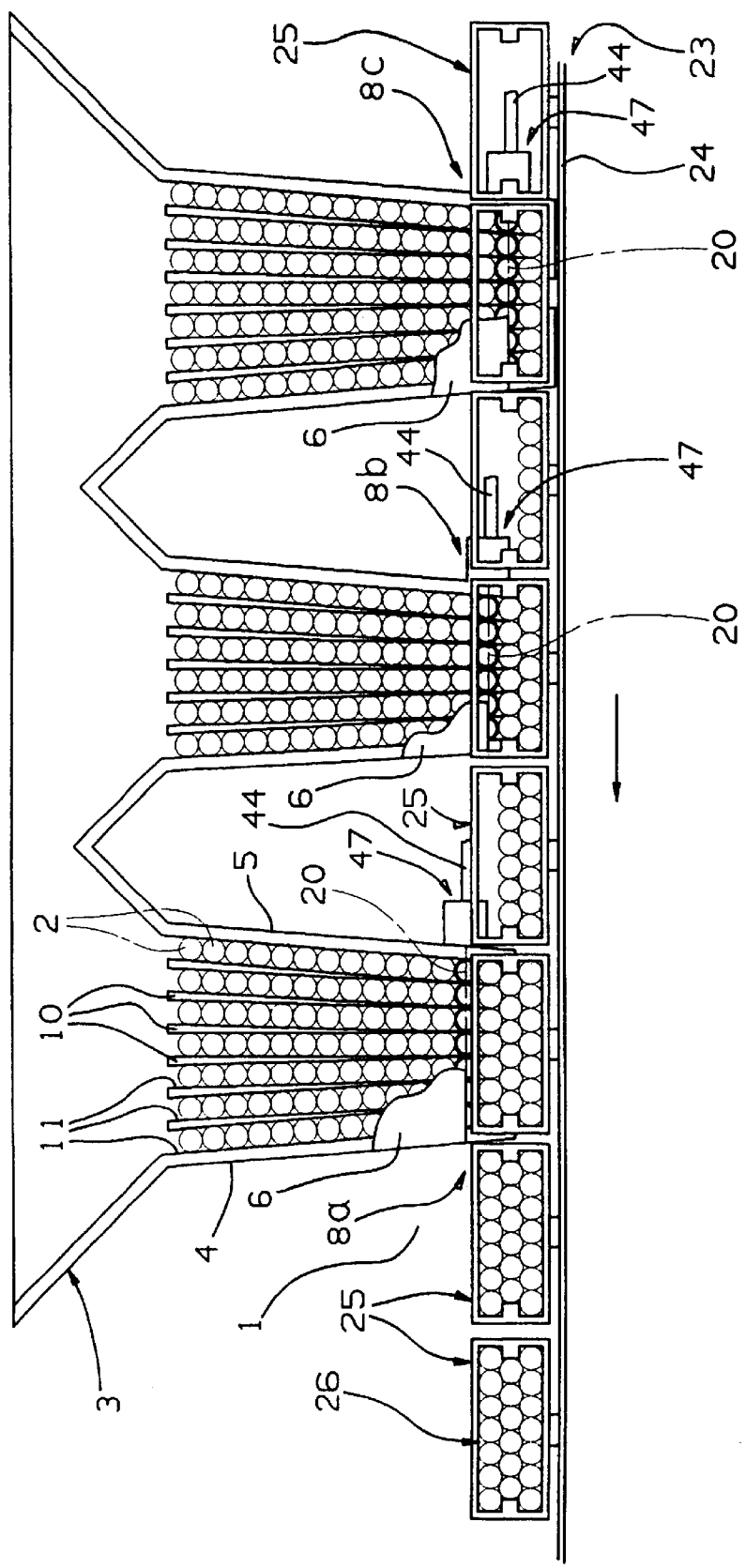
FIG. 8 illustrates a further embodiment of the device according to the present invention, viewed in elevation.

Finally, FIG. 8 illustrates a device of the type utilized to form a group 26 of cigarettes by depositing single layers one on top of another internally of the pocket 25 as it pauses alongside three outlets denoted 8a, 8b and 8c respectively, of a single hopper 3.

In this case, transversely acting restraining means 47 are positioned in alignment with a second layer of each of the three outlets, operating in exactly the same way as described in FIG. 6 in such a way as to prevent the cigarettes of this same layer from being compressed axially against the front wall 6 of the respective outlet 8 as each bottom layer in turn is transferred to the pocket.

What is claimed is:

1. A device for forming groups of cigarettes, comprising:

a hopper through which to direct a flow of cigarettes disposed horizontally side by side and advancing each in a direction transverse to its longitudinal axis toward at least one discharge outlet of the hopper enclosed at the bottom by a substantially horizontal plate and laterally by two side walls lying parallel to the longitudinal axis, fitted internally with a plurality of partition walls disposed substantially parallel to the side walls and defining a plurality of channels between the selfsame side walls of width equal substantially to the diameter of one cigarette;

a pocket conveyor moving transversely to the direction of the flow;

a reciprocating transfer device capable of movement generated in a direction parallel to the longitudinal axis through a transfer station coinciding with the outlet, by which a portion of the flow is engaged during each forward stroke and transferred from the hopper to a respective pocket to form a group;

restraining means able to prevent a relative axial sliding movement of the cigarettes, acting transversely to the axis and activated during each forward stroke of the transfer device at a location coinciding with at least one of the predetermined positions occupied internally of the hopper by the cigarettes in contact with the portion of the flow engaged by the transfer device.

2. A device as in claim 1, wherein the transversely acting restraining means comprise a pneumatic circuit acting on the cylindrical surfaces of cigarettes occupying a predetermined position.

3. A device as in claim 2, wherein the pneumatic circuit comprises a source of negative pressure, and a pipeline by which the selfsame source is connected to the inside of at least one of the channels at a location coinciding with the predetermined position.

4. A device as in claim 3, wherein the pneumatic circuit comprises valve means operating cyclically and to a predetermined timing sequence in conjunction with the transfer device.

5. A device as in claim 4, wherein the part of the pneumatic circuit relative to a predetermined position comprises a duct located inside one of the partition walls, extending parallel to the longitudinal axis, and at least one hole by which the duct is connected to a channel of the hopper at a location coinciding with the predetermined position.

6. A device as in claim 4, wherein the part of the pneumatic circuit relative to a predetermined position comprises at least one hole passing through one of the two side walls, by which the circuit is connected to a channel of the hopper at a location coinciding with the predetermined position.

7. A device as in claim 5, wherein the predetermined position coincides with a groove extending parallel to the longitudinal axis and presenting an arcuate section.

8. A device as in claim 1, of which the hopper outlet is occupied by cigarettes arranged on the bottom plate in horizontal layers lying one on top of another and compassed between two mutually opposed walls of the hopper disposed transversely to the longitudinal axes of the cigarettes, interconnecting the side walls and terminating in respective bottom edges combining with the plate and with the side walls to create two openings aligned on the axes and serving respectively to admit the transfer device and to allow the ejection of a portion of the flow consisting in at least one layer, wherein the transversely acting restraining means are, installed internally of each channel at locations coinciding with the positions occupied by the cigarettes making up the layer in contact with the ejected portion of the flow and substantially on a level with the bottom edges of the walls.

9. A device as in claim 1, wherein the upwardly directed side of the plate is embodied with flutes each centered on a respective channel, extending parallel to the longitudinal axis of the cigarette and presenting a concave face directed toward the channel, and provided with at least one hole connected to a source of negative pressure by way of a pneumatic circuit equipped with valve means operating cyclically and to a predetermined timing sequence in conjunction with the transfer device.

10. A device as in claim 9, wherein the at least one hole is located in a position on the flute near the opening in the rear wall of the discharge outlet.

11. A device for forming groups of cigarettes as in claim 1, wherein the upwardly directed side of the plate presents a plurality of flutes each centered on a respective channel, extending parallel with the longitudinal axis of the cigarette, presenting a concave face directed toward the channel and provided with at least one hole connected to a source of negative pressure by way of a pneumatic circuit.

12. A device as in claim 11, wherein the pneumatic circuit is equipped with valve means operating cyclically and to a predetermined timing sequence in conjunction with the transfer device.

13. A device as in claim 11, wherein the at least one hole is located in a position on the flute near to the opening in the rear wall of the discharge outlet.

14. A device as in claim 13, wherein the hole is of elongated appearance, extending parallel to the longitudinal axis and establishing a slot.

15. A device as in claim 11, wherein each flute presents a plurality of holes and at least one slot disposed substantially in alignment with the holes and in a position near to the opening in the rear wall of the discharge outlet.

* * * * *